(12) United States Patent
Leather

(10) Patent No.: US 6,618,048 B1
(45) Date of Patent: Sep. 9, 2003

(54) 3D GRAPHICS RENDERING SYSTEM FOR PERFORMING Z VALUE CLAMPING IN NEAR-Z RANGE TO MAXIMIZE SCENE RESOLUTION OF VISUALLY IMPORTANT Z COMPONENTS

(75) Inventor: Mark M. Leather, Saratoga, CA (US)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 09/726,223

(22) Filed: Nov. 28, 2000

Related U.S. Application Data

(60) Provisional application No. 60/226,912, filed on Aug. 23, 2000, provisional application No. 60/226,889, filed on Aug. 23, 2000, provisional application No. 60/226,891, filed on Aug. 23, 2000, provisional application No. 60/226,888, filed on Aug. 23, 2000, provisional application No. 60/226,893, filed on Aug. 23, 2000, provisional application No. 60/227,007, filed on Aug. 23, 2000, provisional application No. 60/226,900, filed on Aug. 23, 2000, provisional application No. 60/226,910, filed on Aug. 23, 2000, provisional application No. 60/226,890, filed on Aug. 23, 2000, provisional application No. 60/226,915, filed on Aug. 23, 2000, provisional application No. 60/227,032, filed on Aug. 23, 2000, provisional application No. 60/226,885, filed on Aug. 23, 2000, provisional application No. 60/227,033, filed on Aug. 23, 2000, provisional application No. 60/226,899, filed on Aug. 23, 2000, provisional application No. 60/226,913, filed on Aug. 23, 2000, provisional application No. 60/227,031, filed on Aug. 23, 2000, provisional application No. 60/227,030, filed on Aug. 23, 2000, provisional application No. 60/226,886, filed on Aug. 23, 2000, provisional application No. 60/226,894, filed on Aug. 23, 2000, provisional application No. 60/226,914, filed on Aug. 23, 2000, provisional application No. 60/227,006, filed on Aug. 23, 2000, and provisional application No. 60/161,915, filed on Oct. 28, 1999.

(51) Int. Cl.[7] ............................................. G06T 15/40
(52) U.S. Cl. ....................... 345/422; 345/421; 345/427; 345/428; 345/506; 345/620; 345/627
(58) Field of Search ................................. 345/419, 421, 345/422, 427, 428, 506, 620, 627

(56) References Cited

U.S. PATENT DOCUMENTS 4,275,413 A    6/1981   Sakamoto et al.

(List continued on next page.)

FOREIGN PATENT DOCUMENTS

CA    2070934    12/1993

(List continued on next page.)

OTHER PUBLICATIONS

Photograph of Sony PlayStation II System.

(List continued on next page.)

*Primary Examiner*—Mark Zimmerman
*Assistant Examiner*—Kimbinh T. Nguyen
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. The graphics pipeline performs Z-buffering and optionally provides memory efficient full scene anti-aliasing (FSAA). When the anti-aliasing rendering mode is selected, Z value bit compression is performed to more efficiently make use of the available Z buffer memory. A Z-clamping arrangement is used to improve the precision of visually important Z components by clamping Z values to zero of pixels that fall within a predetermined Z-axis range near the Z=0 eye/camera (viewport) plane. This allows a Z-clipping plane to be used very close to the eye/camera plane—to avoid undesirable visual artifacts produced when objects rendered near to the eye/camera plane are clipped—while preserving Z value precision for the remaining depth of the scene. In an example implementation, a Z value compression circuit provided in the graphics pipeline is enhanced to effectuate Z-clamping within the predetermined range of Z values. The enhanced circuitry includes an adder for left-shifting an input Z value one or more bits prior to compression and gates for masking out the most significant non-zero shifted bits to zero.

7 Claims, 10 Drawing Sheets

U.S. PATENT DOCUMENTS

| | | |
|---|---|---|
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,582,451 A | 12/1996 | Baumann |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |

| Patent | Date | Inventor | Patent | Date | Inventor |
|---|---|---|---|---|---|
| 5,687,357 A | 11/1997 | Priem | 5,838,334 A | 11/1998 | Dye |
| 5,691,746 A | 11/1997 | Shyu | 5,844,576 A | 12/1998 | Wilde et al. |
| 5,694,143 A | 12/1997 | Fielder et al. | 5,850,229 A | 12/1998 | Edelsbrunner et al. |
| 5,696,892 A | 12/1997 | Redmann et al. | 5,856,829 A | 1/1999 | Gray, III et al. |
| 5,701,444 A | 12/1997 | Baldwin | 5,859,645 A | 1/1999 | Latham |
| 5,703,806 A | 12/1997 | Puar et al. | 5,861,888 A | 1/1999 | Dempsey |
| 5,706,481 A | 1/1998 | Hannah et al. | 5,861,893 A | 1/1999 | Sturgess |
| 5,706,482 A | 1/1998 | Matsushima et al. | 5,867,166 A | 2/1999 | Myhrvold et al. |
| 5,714,981 A | 2/1998 | Scott-Jackson et al. | 5,870,097 A | 2/1999 | Snyder et al. |
| 5,721,947 A | 2/1998 | Priem et al. | 5,870,098 A | 2/1999 | Gardiner |
| 5,724,561 A | 3/1998 | Tarolli et al. | 5,870,102 A | 2/1999 | Tarolli et al. |
| 5,726,689 A | 3/1998 | Negishi et al. | 5,870,109 A | 2/1999 | McCormack et al. |
| 5,726,947 A | 3/1998 | Yamazaki et al. | 5,870,587 A | 2/1999 | Danforth et al. |
| 5,727,192 A | 3/1998 | Baldwin | 5,872,902 A | 2/1999 | Kuchkuda et al. |
| 5,734,386 A | 3/1998 | Cosman | 5,874,969 A | 2/1999 | Storm et al. |
| 5,739,819 A | 4/1998 | Bar-Nahum | 5,877,741 A | 3/1999 | Chee et al. |
| 5,740,343 A | 4/1998 | Tarolli et al. | 5,877,770 A | 3/1999 | Hanaoka |
| 5,740,383 A | 4/1998 | Nally et al. | 5,877,771 A | 3/1999 | Drebin et al. |
| 5,740,406 A | 4/1998 | Rosenthal et al. | 5,880,736 A | 3/1999 | Peercy et al. |
| 5,742,749 A | 4/1998 | Foran et al. | 5,880,737 A | 3/1999 | Griffin et al. |
| 5,742,788 A | 4/1998 | Priem et al. | 5,883,638 A | 3/1999 | Rouet et al. |
| 5,745,118 A | 4/1998 | Alcorn et al. | 5,886,701 A | 3/1999 | Chauvin et al. |
| 5,745,125 A | 4/1998 | Deering et al. | 5,886,705 A | 3/1999 | Lentz |
| 5,748,199 A | 5/1998 | Palm | 5,887,155 A | 3/1999 | Laidig |
| 5,748,986 A | 5/1998 | Butterfield et al. | 5,890,190 A | 3/1999 | Rutman |
| 5,751,291 A | 5/1998 | Olsen et al. | 5,892,517 A | 4/1999 | Rich |
| 5,751,292 A | 5/1998 | Emmot | 5,892,974 A | 4/1999 | Koizumi et al. |
| 5,751,295 A | 5/1998 | Becklund et al. | 5,894,300 A | 4/1999 | Takizawa |
| 5,751,930 A | 5/1998 | Katsura et al. | 5,900,881 A | 5/1999 | Ikedo |
| 5,754,191 A | 5/1998 | Mills et al. | 5,903,283 A | 5/1999 | Selwan et al. |
| 5,757,382 A | 5/1998 | Lee | 5,909,218 A | 6/1999 | Naka et al. |
| 5,758,182 A | 5/1998 | Rosenthal et al. | 5,909,225 A | 6/1999 | Schinnerer et al. |
| 5,760,783 A | 6/1998 | Migdal et al. | 5,912,675 A | 6/1999 | Laperriere |
| 5,764,228 A | 6/1998 | Baldwin | 5,912,676 A | 6/1999 | Malladi et al. |
| 5,764,237 A | 6/1998 | Kaneko | 5,914,721 A | 6/1999 | Lim |
| 5,764,243 A | 6/1998 | Baldwin | 5,914,725 A | 6/1999 | MacInnis et al. |
| 5,767,856 A | 6/1998 | Peterson et al. | 5,914,729 A | 6/1999 | Lippincott |
| 5,767,858 A | 6/1998 | Kawase et al. | 5,917,496 A | 6/1999 | Fujita et al. |
| 5,768,626 A | 6/1998 | Munson et al. | 5,920,326 A | 7/1999 | Rentschler et al. |
| 5,768,629 A | 6/1998 | Wise et al. | 5,920,876 A | 7/1999 | Ungar et al. |
| 5,774,133 A | 6/1998 | Neave et al. | 5,923,332 A | 7/1999 | Izawa |
| 5,777,623 A | 7/1998 | Small | 5,923,334 A | 7/1999 | Luken |
| 5,777,629 A | 7/1998 | Baldwin | 5,926,182 A | 7/1999 | Menon et al. |
| 5,781,927 A | 7/1998 | Wu et al. | 5,926,647 A | 7/1999 | Adams et al. |
| 5,791,994 A | 8/1998 | Hirano et al. | 5,933,150 A | 8/1999 | Ngo et al. |
| 5,798,770 A | 8/1998 | Baldwin | 5,933,154 A | 8/1999 | Howard et al. |
| 5,801,706 A | 9/1998 | Fujita et al. | 5,933,155 A | 8/1999 | Akeley |
| 5,801,711 A | 9/1998 | Koss et al. | 5,933,529 A | 8/1999 | Kim |
| 5,801,716 A | 9/1998 | Silverbrook | 5,936,641 A | 8/1999 | Jain et al. |
| 5,801,720 A | 9/1998 | Norrod et al. | 5,936,683 A | 8/1999 | Lin |
| 5,805,175 A | 9/1998 | Priem | 5,940,086 A | 8/1999 | Rentschler et al. |
| 5,805,868 A | 9/1998 | Murphy | 5,940,089 A | 8/1999 | Dilliplane et al. |
| 5,808,619 A | 9/1998 | Choi et al. | 5,940,538 A | 8/1999 | Spiegel et al. |
| 5,808,630 A | 9/1998 | Pannell | 5,943,058 A | 8/1999 | Nagy |
| 5,809,219 A | 9/1998 | Pearce et al. | 5,943,060 A | 8/1999 | Cosman et al. |
| 5,809,278 A | 9/1998 | Watanabe et al. | 5,945,997 A | 8/1999 | Zhao et al. |
| 5,815,165 A | 9/1998 | Blixt | 5,949,421 A | 9/1999 | Ogletree et al. |
| 5,815,166 A | 9/1998 | Baldwin | 5,949,423 A | 9/1999 | Olsen |
| 5,818,456 A | 10/1998 | Cosman et al. | 5,949,424 A | 9/1999 | Cabral et al. |
| 5,819,017 A * | 10/1998 | Akeley et al. .............. 345/421 | 5,949,428 A | 9/1999 | Toelle et al. |
| 5,821,940 A | 10/1998 | Morgan et al. | 5,949,440 A | 9/1999 | Krech, Jr. et al. |
| 5,821,949 A | 10/1998 | Deering | 5,956,042 A | 9/1999 | Tucker et al. |
| 5,822,516 A | 10/1998 | Krech, Jr. | 5,956,043 A | 9/1999 | Jensen |
| 5,828,382 A | 10/1998 | Wilde | 5,958,020 A | 9/1999 | Evoy et al. |
| 5,828,383 A | 10/1998 | May et al. | 5,959,640 A | 9/1999 | Rudin et al. |
| 5,828,907 A | 10/1998 | Wise et al. | 5,963,220 A | 10/1999 | Lee et al. |
| 5,831,624 A | 11/1998 | Tarolli et al. | 5,966,134 A | 10/1999 | Arias |
| 5,831,625 A | 11/1998 | Rich et al. | 5,969,726 A | 10/1999 | Rentschler et al. |
| 5,831,640 A | 11/1998 | Wang et al. | 5,977,979 A | 11/1999 | Clough et al. |
| 5,835,096 A | 11/1998 | Baldwin | 5,977,984 A | 11/1999 | Omori |
| 5,835,792 A | 11/1998 | Wise et al. | 5,982,376 A | 11/1999 | Abe et al. |

| | | |
|---|---|---|
| 5,982,390 A | 11/1999 | Stoneking et al. |
| 5,986,659 A | 11/1999 | Gallery et al. |
| 5,986,663 A | 11/1999 | Wilde |
| 5,986,677 A | 11/1999 | Jones et al. |
| 5,987,567 A | 11/1999 | Rivard et al. |
| 5,990,903 A | 11/1999 | Donovan |
| 5,995,120 A | 11/1999 | Dye |
| 5,995,121 A | 11/1999 | Alcorn et al. |
| 5,999,189 A | 12/1999 | Kajiya et al. |
| 5,999,196 A | 12/1999 | Storm et al. |
| 5,999,198 A | 12/1999 | Horan et al. |
| 6,002,407 A | 12/1999 | Fadden |
| 6,002,409 A | 12/1999 | Harkin |
| 6,002,410 A | 12/1999 | Battle |
| 6,005,582 A | 12/1999 | Gabriel et al. |
| 6,005,583 A | 12/1999 | Morrison |
| 6,005,584 A | 12/1999 | Kitamura et al. |
| 6,007,428 A | 12/1999 | Nishiumi et al. |
| 6,008,820 A | 12/1999 | Chauvin et al. |
| 6,011,562 A | 1/2000 | Gagne et al. |
| 6,011,565 A | 1/2000 | Kuo et al. |
| 6,014,144 A | 1/2000 | Nelson et al. |
| 6,016,150 A | 1/2000 | Lengyel et al. |
| 6,016,151 A | 1/2000 | Lin |
| 6,018,350 A | 1/2000 | Lee et al. |
| 6,020,931 A | 2/2000 | Bilbrey et al. |
| 6,021,417 A | 2/2000 | Massarksy |
| 6,022,274 A | 2/2000 | Takeda et al. |
| 6,023,261 A | 2/2000 | Ugajin |
| 6,023,738 A | 2/2000 | Priem et al. |
| 6,025,853 A | 2/2000 | Baldwin |
| 6,026,182 A | 2/2000 | Lee et al. |
| 6,028,608 A | 2/2000 | Jenkins |
| 6,028,611 A | 2/2000 | Anderson et al. |
| 6,031,542 A | 2/2000 | Wittig |
| 6,035,360 A | 3/2000 | Doidge et al. |
| 6,037,948 A | 3/2000 | Liepa |
| 6,037,949 A | 3/2000 | DeRose et al. |
| 6,038,031 A | 3/2000 | Murphy |
| 6,038,348 A | 3/2000 | Carley |
| 6,040,843 A | 3/2000 | Monroe et al. |
| 6,040,844 A | 3/2000 | Yamaguchi et al. |
| 6,041,010 A | 3/2000 | Puar et al. |
| 6,043,804 A | 3/2000 | Greene |
| 6,043,821 A | 3/2000 | Sprague et al. |
| 6,046,746 A * | 4/2000 | Deering ............... 345/422 |
| 6,046,747 A | 4/2000 | Saunders et al. |
| 6,046,752 A | 4/2000 | Kirkland et al. |
| 6,049,337 A | 4/2000 | Van Overveld |
| 6,049,338 A | 4/2000 | Anderson et al. |
| 6,052,125 A | 4/2000 | Gardiner et al. |
| 6,052,126 A | 4/2000 | Sakuraba et al. |
| 6,052,127 A | 4/2000 | Vaswani et al. |
| 6,052,129 A | 4/2000 | Fowler et al. |
| 6,052,133 A | 4/2000 | Kang |
| 6,054,993 A | 4/2000 | Devic et al. |
| 6,054,999 A | 4/2000 | Strandberg |
| 6,057,847 A | 5/2000 | Jenkins |
| 6,057,849 A | 5/2000 | Haubner et al. |
| 6,057,851 A | 5/2000 | Luken et al. |
| 6,057,852 A | 5/2000 | Krech, Jr. |
| 6,057,859 A | 5/2000 | Handelman et al. |
| 6,057,861 A | 5/2000 | Lee et al. |
| 6,057,862 A | 5/2000 | Margulis |
| 6,057,863 A | 5/2000 | Olarig |
| 6,061,462 A | 5/2000 | Tostevin et al. |
| 6,064,392 A | 5/2000 | Rohner |
| 6,067,098 A | 5/2000 | Dye |
| 6,070,204 A | 5/2000 | Poisner |
| 6,072,496 A | 6/2000 | Guenter et al. |
| 6,075,543 A | 6/2000 | Akeley |
| 6,075,546 A | 6/2000 | Hussain et al. |
| 6,078,311 A | 6/2000 | Pelkey |
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,124 A | 7/2000 | Priem et al. |
| 6,092,158 A | 7/2000 | Harriman et al. |
| 6,094,200 A | 7/2000 | Olsen et al. |
| 6,097,435 A | 8/2000 | Stanger et al. |
| 6,097,437 A | 8/2000 | Hwang |
| 6,104,415 A | 8/2000 | Gossett |
| 6,104,417 A | 8/2000 | Nielsen et al. |
| 6,105,094 A | 8/2000 | Lindeman |
| 6,108,743 A | 8/2000 | Debs et al. |
| 6,111,582 A | 8/2000 | Jenkins |
| 6,111,584 A | 8/2000 | Murphy |
| 6,115,047 A | 9/2000 | Deering |
| 6,115,049 A | 9/2000 | Winner et al. |
| 6,118,462 A | 9/2000 | Margulis |
| 6,128,026 A | 10/2000 | Brothers, III |
| 6,144,365 A | 11/2000 | Young et al. |
| 6,144,387 A | 11/2000 | Liu et al. |
| 6,151,602 A | 11/2000 | Hejlsberg et al. |
| 6,155,926 A | 12/2000 | Miyamoto et al. |
| 6,157,387 A | 12/2000 | Kotani |
| 6,166,748 A | 12/2000 | Van Hook et al. |
| 6,172,678 B1 | 1/2001 | Shiraishi |
| 6,173,367 B1 | 1/2001 | Aleksic et al. |
| 6,177,944 B1 | 1/2001 | Fowler et al. |
| 6,181,352 B1 | 1/2001 | Kirk et al. |
| 6,191,794 B1 | 2/2001 | Priem et al. |
| 6,198,488 B1 | 3/2001 | Lindholm et al. |
| 6,200,253 B1 | 3/2001 | Nishiumi et al. |
| 6,204,851 B1 | 3/2001 | Netschke et al. |
| 6,215,496 B1 | 4/2001 | Szeliski et al. |
| 6,215,497 B1 | 4/2001 | Leung |
| 6,226,012 B1 | 5/2001 | Priem et al. |
| 6,226,713 B1 | 5/2001 | Mehrotra |
| 6,232,981 B1 | 5/2001 | Gossett |
| 6,236,413 B1 | 5/2001 | Gossett et al. |
| 6,239,810 B1 | 5/2001 | Van Hook et al. |
| 6,252,608 B1 | 6/2001 | Snyder et al. |
| 6,252,610 B1 | 6/2001 | Hussain |
| 6,264,558 B1 | 7/2001 | Nishiumi et al. |
| 6,268,861 B1 | 7/2001 | Sanz-Pastor et al. |
| 6,275,235 B1 | 8/2001 | Morgan, III |
| 6,285,779 B1 * | 9/2001 | Lapidous et al. ........... 345/422 |
| 6,292,194 B1 | 9/2001 | Powell, III |
| 6,329,997 B1 | 12/2001 | Wu et al. |
| 6,331,856 B1 | 12/2001 | Van Hook et al. |
| 6,339,428 B1 | 1/2002 | Fowler et al. |
| 6,342,892 B1 | 1/2002 | Van Hook et al. |
| 6,353,438 B1 | 3/2002 | Van Hook et al. |
| 6,356,497 B1 | 3/2002 | Puar et al. |
| 6,408,362 B1 | 6/2002 | Arimilli et al. |
| 6,417,858 B1 | 7/2002 | Bosch et al. |
| 6,426,747 B1 | 7/2002 | Hoppe et al. |
| 6,437,781 B1 | 8/2002 | Tucker et al. |
| 6,459,429 B1 | 10/2002 | Deering |
| 6,466,223 B1 | 10/2002 | Dorbie et al. |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |

FOREIGN PATENT DOCUMENTS

| | | |
|---|---|---|
| EP | 0 637 813 A2 | 2/1995 |
| EP | 1 074 945 | 2/2001 |
| EP | 1 075 146 | 2/2001 |
| EP | 1 081 649 | 3/2001 |
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
PlayStation II:Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, ©1999.
Press Releases, Mar. 18, 1999.
Chris Johnston, "PlayStation Part Deux", Press Start, ©1999.
Nikkei Shimbun, "Sony Making SME, Chemical and SPT into Wholly–Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit– Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Currently Avaliable for Macs Only, Business Wire, Mar. 12, 1999.
"DexDrive Bridges Gap", The Tampa Tribune, Mar. 12, 1999.
A Microprocessor With a 128b CPU, 10 Floating–Point MAC', 4 Floating–Point Dividers, and an MPEG2 Decoder, 1999 IEEE International Solid–State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know Abotu Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., ©1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000, www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentaion: D3D 7 Vertex Lighting, Mar. 15, 2000, www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, 2/99, www.game–revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addison–Wesley Publishing Co., 1993.

"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 01, 2000).

White paper, Spitzer, John, et al., "Using GLNV–arrayrange and GLNVFence on GEForce Products and Beyond" (Aug. 1, 2000).

White paper, Rogers, Douglas H., "Optimizing Direct3D for the GeForce 256" (Jan. 3, 2000).

Hook, Brian, "An Incomplete Guide to Programming DirectDraw and Direct3D Immediate Mode (Release 0.46)," printed from web site: www.wksoftware.com, 42 pages.

Thompson, Tom, "Must–See 3–D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 97).

"HowTo: Animate Textures in Direct3D Immediate Mode," printed from web site support.microsoft.com, 3 pages (last reviewed Dec. 15, 2000).

Info: "Rendering a Triangle Using an Execute Buffer," printed from web site support.microsoft.com, 6 pages (last reviewed Oct. 20, 2000).

U.S. application Ser. No. 09/337,293, filed Jun. 21, 1999, Multi–Format Vertex Data Processing Apparatus and Method [issued as U.S. Patent No. 6,501,479 B1 on Dec. 31, 2002].

Datasheet, SGS–Thomson Microelectronics, nVIDIA™, RIVA 128 ™ 128–Bit 3D Multimedia Accelerator (Oct. 1997).

Product Presentation, "RIVA128™ Leadership 3D Acceleration," 2 pages.

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha–channel Transparency," Jan. 15, 1999, wysiwyg://16/http://www4zdnet.com...ies/reviews/0,4161,2188286, 00.html.

Blythe, David, 5.6 Transparency Mapping and Trimming with Alpha, http://toolbox.sgi.com/TasteOfDT/d...penGL/advanced98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A–buffer Algorithm," Computer Graphics Proceedings, Annual Conference Series, 1997, pp. 307–316.

Debevec, Paul, et al., "Efficient View–Dependent Image–Based Rendering with Projective Texture–Mapping," University of California at Berkeley.

Gibson, Simon, et al., "Interactive Rendering with Real–World Illumination," Rendering Techniques 2000; 11th Eurographics Workshop on Rendering , pp. 365–376, (Jun. 2000).

Segal, Mark, et al., "Fast Shadows and Lighting Effects Using Texture Mapping,"Computer Graphics, 26, 2, pp.. 249–252 (Jul. 1992).

White paper, Kilgard, Mark J., "Improving Shadows and Reflections via the Stencil Buffer" (Nov. 3, 1999).

"OpenGL Projected Textures," from web site:HTTP:// reality.sgi.com, 5 pages.

"5.13.1 How to Project a Texture," rom web site: www.sgi.com, 2 pages.

Arkin, Alan, email, subject: "Texture distortion problem," from web site: HTTP://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," .Computer Graphics (SIGGRAPH '78 Proceedings), vol. 12, No. 3, pp. 270–274 (Aug. 1978).

Woo et al., "A Survey of Shadow Algorithms," IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al, "Algorithms and Antialiased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tools, PhotoRealistic RenderMan 3.8 User's Manual, Pixar (Aug. 1998).

RenderMan Interface Vision 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending"(Dec. 16, 1999).

Peter J. Kovach, INSIDE DIRECT 3D, "Alpha Testing," pp. 289–291 (1999).

Web site information, CartoonReyes, REM Infografica, http://www.digimotion.co.uk/cartoonreyes.htm.

Raskar, Ramesh et al., "Image Precision Silhouette Edges, "Symposium on Interactive 3D Graphics1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp. 131–137.

Schlechtweg, Stefan, et al., "Emphasising in Line–drawings," Norsk samarbeid innen grafisk databehandling: NOR-SIGD Info, medlemsblad for NORSIGD, Nr 1/95, pp. 9–10.

Markosian, Lee et al., "Real–Time Nonphotorealistic Rendering," Brown University site of the NSF Science and Technology Center for Computer Graphics and Scientific Visualization, Providence, RI, 5 pages (undated).

Feth, Bill, "Non–Photorealistic Rendering," wif3@cornell.edu, CS490 –Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.–Mar. 1998.

Zeleznik, Robert et al. "SKETCH: An Interface for Sketching 3D Scenes," Computer Graphics Proceedings, Annual Conference Series 1996, pp. 163–170.

Computer Graphics World, Dec. 1997.

Reynolds, Craig, "Stylized Depiction in Computer Graphics, Non–Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon–Looking Rendering of 3D Scenes," Syntim Project Inria, 6 pages, http://www–syntim.inria.fr/syntim/recherche/decaudin/cartoon–eng.html.

Hachigian, Jennifer, "Super Cel Shader 1.00 Tips and Tricks," 2 pages, wysiwyg://thePage. .13/http://members.xoom.com/ –XMCM.jarvia/3D/celshade.html.

Digimation Inc., "The Incredible Comicshop,"info sheet, 2 pages, http://www.digimation.com/asp/product/asp?product _id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo –Scene III, info sheet, Cambridge Animation Systems, 2 pages, http://www.camani.co.uk/casweb/products/software/SceneIII.htm.

Mulligan, Vikram, Toon, info sheet, 2 pages, http://digitalcarversguild.com/products/toon/toon.thml.

Toony Shaders, "Dang I'm tired of photorealism, " 4 pages, http://www.visi.com/~mcdonald/toony.html.

"Cartoon Shading, Using Shading Mapping, "1 page, http://www.goat.com/alias/shaders.html#toonshad.

web site information, CartoonReyes, http://www.zentertainment.com/zentropy/review/cartoonreyes.html.

The RenderMan Interface Version 3.1, (Sep. 1989).

"Renderman Artist Tools, PhotoRealistic RenderMan Tutorial,"Pixar (Jan. 1996).

Web site materials, "Renderman Artist Tools, PhotoRealistic RenderMan 3.8 User's Manual," Pixar.

"AGDC Per Pixel Shading " (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro,"(7 pages) from ati.com web site (2000).

Slide Presentation, Sébastien Dominé, "nVIDIA Mesh Skinning, OpenGl".

Singh, Karen et al., "Skinning Characters using Surface–Oriented Free–Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307–312.

Shade, Jonathan et al., "Layered Depth Images," Computer Graphics Proceedings, Annual Conference Series, pp. 231–242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of Siggraph, pp. 269–276 (Aug. 8–13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109–116.

* cited by examiner

Fig. 5  EXAMPLE GRAPHICS PROCESSOR FLOW

# 3D GRAPHICS RENDERING SYSTEM FOR PERFORMING Z VALUE CLAMPING IN NEAR-Z RANGE TO MAXIMIZE SCENE RESOLUTION OF VISUALLY IMPORTANT Z COMPONENTS

CROSS-REFERENCES TO RELATED APPLICATIONS

This application is related to the following commonly assigned applications identified below, which focus on various aspects of the graphics system described herein. Each of the following applications are incorporated herein by reference:

provisional application No. 60/161,915, filed Oct. 28, 1999 and its corresponding utility application Ser. No. 09/465,754, filed Dec. 17, 1999, both entitled "Vertex Cache For 3D Computer Graphics";

provisional application No. 60/226,912, filed Aug. 23, 2000 and its corresponding utility application Ser. No. 09/726,215, filed Nov. 28, 2000, both entitled "Method and Apparatus for Buffering Graphics Data in a Graphics System";

provisional application No. 60/226,889, filed Aug. 23, 2000 and its corresponding utility application Ser. No. 09/722,419, filed Nov. 28, 2000, both entitled "Graphics Pipeline Token Synchronization";

provisional application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System";

provisional application No. 60/226,888, filed Aug. 23, 2000 and its corresponding utility application Ser. No. 09/722,367, filed Nov. 28, 2000, both entitled "Recirculating Shade Tree Blender For A Graphics System";

provisional application No. 60/226,893, filed Aug. 23, 2000 and its corresponding utility application Ser. No. 09/722,381 filed Nov. 28, 2000, both entitled "Method And Apparatus For Environment-Mapped Bump-Mapping In A Graphics System";

provisional application No. 60/227,007, filed Aug. 23, 2000 and its corresponding utility application Ser. No. 09/726,216, filed Nov. 28, 2000, both entitled "Achromatic Lighting in a Graphics System and Method";

provisional application No. 60/226,900, filed Aug. 23, 2000 and its corresponding utility application Ser. No. 09/726,226, filed Nov. 28, 2000, both entitled "Method And Apparatus For Anti-Aliasing In A Graphics System";

provisional application No. 60/226,910, filed Aug. 23, 2000 and its corresponding utility application Ser. No. 09/722,380, filed Nov. 28, 2000, both entitled "Graphics System With Embedded Frame Buffer Having Reconfigurable Pixel Formats";

utility application Ser. No. 09/585,329, filed Jun. 2, 2000, entitled "Variable Bit Field Color Encoding";

provisional application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode";

provisional application No. 60/226,915, filed Aug. 23, 2000 and its corresponding utility application Ser. No. 09/726,212 filed Nov. 28, 2000, both entitled "Method And Apparatus For Providing Non-Photorealistic Cartoon Outlining Within A Graphics System";

provisional application No. 60/227,032, filed Aug. 23, 2000 and its corresponding utility application Ser. No. 09/726,225, filed Nov. 28, 2000, both entitled "Method And Apparatus For Providing Improved Fog Effects In A Graphics System";

provisional application No. 60/226,885, filed Aug. 23, 2000 and its corresponding utility application Ser. No. 09/722,664, filed Nov. 28, 2000, both entitled "Controller Interface For A Graphics System";

provisional application No. 60/227,033, filed Aug. 23, 2000 and its corresponding utility application Ser. No. 09/726,221, filed Nov. 28, 2000, both entitled "Method And Apparatus For Texture Tiling In A Graphics System";

provisional application No. 60/226,899, filed Aug. 23, 2000 and its corresponding utility application Ser. No. 09/722,667, filed Nov. 28, 2000, both entitled "Method And Apparatus For Pre-Caching Data In Audio Memory";

provisional application No. 60/226,913, filed Aug. 23, 2000 and its corresponding utility application Ser. No. 09/722,378, filed Nov. 28, 2000, both entitled "Z-Texturing";

provisional application No. 60/227,031, filed Aug. 23, 2000 entitled "Application Program Interface for a Graphics System", provisional application No. 60/227,030, filed Aug. 23, 2000 and its corresponding utility application Ser. No. 09/722,663, filed Nov. 28, 2000, both entitled "Graphics System With Copy Out, Conversions Between Embedded Frame Buffer And Main Memory";

provisional application No. 60/226,886, filed Aug. 23, 2000 and its corresponding utility application Ser. No. 09/722,665, filed Nov. 28, 2000, both entitled "Method and Apparatus for Accessing Shared Resources";

provisional application No. 60/226,894, filed Aug. 23, 2000 and its corresponding utility application Ser. No. 09/726,220, filed Nov. 28, 2000, both entitled "Graphics Processing System With Enhanced Memory Controller";

provisional application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and provisional application No. 60/227,006, filed Aug. 23, 2000 and its corresponding utility application Ser. No. 09/722,421, filed Nov. 28, 2000, both entitled "Shadow Mapping In A Low Cost Graphics System".

FIELD OF THE INVENTION

The present invention relates to computer graphics, and more particularly to interactive graphics systems such as home video game platforms. Still more particularly this invention relates to Z-value clamping in the near-Z range when rendering anti-aliased scenes to maximize precision of visually important Z components and to avoid near-Z clipping.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

Most 3D graphics computer systems render and prepare images for display in response to polygon vertex attribute data which typically includes a Z-axis (scene depth) value. A well known technique called Z-buffering is often used to properly render objects in accordance with their respective depth (i.e., distance from the viewer/camera) in a 3D scene. Since processing a lot of 3D image polygon vertex attribute data can become very time consuming, graphics system designers often employ a polygon culling and clipping process to eliminate the processing of the non-displayed image data. This non-displayed image data is typically polygon vertex data that is outside a viewing frustrum bounded by predetermined "clipping" planes in a virtual 3D image rendering space called "camera space" (also called "screen space"). For example, portions of a 3D scene or object that are behind the camera (viewport) position need not be rendered and may be culled or clipped. Likewise, scene portions and 3D objects very far in the scene distance (i.e., far from the camera/eye position along the scene depth or Z-axis) need not be rendered.

Scene depth clipping may be performed using both a near clipping plane and a far clipping plane where the far clipping plane is many times the depth of the near clipping plane. Scene depth clipping may also be performed with a clipping plane at or behind the camera/eye position (i.e., the Z=0 plane) or without using a near clipping plane altogether. However, for various reasons not discussed in detail here, rendering 3D objects at or very close to the camera/eye position may cause certain data processing problems such as overflow and wrapping errors due to the small Z values involved. For example, in the case of geometry projection, vertices that get "too close" to the camera (Z=0) plane get a w (homogeneous coordinate scale factor) value that is very small. Dividing vertex x, y and z coordinates attributes by such small w values during screen-space transformation operations often causes precision and overflow problems-especially when w=0, where the resulting scale values are infinite. Clipping geometry to a near-plane avoids such problems—each triangle with offending vertices is cut into pieces by the near-plane, and the half that is 'too close' is thrown away. Consequently, if scene depth clipping is performed using a near clipping plane in front of the camera/eye position, the near clipping plane should be positioned far enough in front of the camera that such overflow and wrapping errors do not occur.

Alternatively, if scene depth clipping is performed without using a near clipping plane, or with a clipping plane at or behind the camera/eye position, it may be necessary to burden the applications program with the responsibility of preventing such overflows and wrapping problems by policing the permissible distance between the camera position and a rendered object. A problem graphics system designers confronted in the past is how to avoid certain undesirable visual effects associated with the clipping of polygons of a displayed 3D image object that approaches the plane of the viewer (i.e., the camera/eye plane). In particular, graphics artists and game developers never want to see a 3D object clipped by a clipping plane placed in front of the viewer, as this produces a hole in the object and gives the appearance that objects are hollow. One solution is to define a six plane viewing frustrum clipping box having the near clipping plane very close to the eye/camera plane (i.e., the Z=0 plane) and establish an application program rule that no 3D animated objects should come closer to the eye/camera plane than the near clipping plane. With the near clipping plane placed very close to the eye/camera plane, it less likely that objects that need to be rendered somewhat near the eye/camera plane will come so close as to suffer the ill effects of clipping. Unfortunately, placing the near clipping plane very close to the eye/camera plane reduces the Z depth precision towards the far clipping plane. This Z precision problem is particularly exacerbated when only a limited number of Z-buffer bits are available for depth precision. The less bits that are available for representing a Z value, the greater the precision problem.

If performing Z-buffering in a graphics system where a large number a bits, for example, 24 bits or more, are available in the hardware for representing Z-axis depth values, Z value precision may not pose a problem. However, in certain systems or implementations where less bits are available for representing Z-axis depth values, lack of sufficient Z value precision can seriously effect Z-buffering performance and accuracy. For example, in certain implementations it may be desirable to perform data compression to accommodate storage memory constraints. If Z data compression is performed, the degree of Z precision for providing accurate Z-buffering may be adversely affected.

The present invention also solves the above problems by providing techniques and arrangements in a 3D graphics rendering system for preserving Z value depth precision when performing Z-buffering where the Z value depth data must be compressed.

The present invention also solves the above problems by providing techniques and arrangements in a 3D graphics rendering system for allowing a Z-clipping plane to be used very close to the eye/camera plane—to avoid undesirable visual artifacts produced when objects are rendered too near to the eye/camera plane—while preserving Z value depth precision.

The present invention also solves the above problems by providing techniques and arrangements in a 3D graphics rendering system for performing Z-buffering where the Z depth value associated with a polygon vertex is represented using, for example, 23 bits or less.

More specifically, in an exemplary embodiment of the present invention, a Z-clamping arrangement is employed to improve the precision of visually important Z components by providing Z value clamping within a predetermined range of the Z=0 eye/camera (viewport) plane. This arrangement allows a Z-clipping plane to be used very close to the eye/camera plane—to avoid undesirable visual artifacts produced when objects rendered near to the eye/camera plane are clipped-while preserving Z precision. A near clipping plane, "znear", is established at a Z plane very close to the Z=0 plane and a far clipping plane, "z-far", is established at a Z plane far from the Z=0 plane. A clamping plane, "znear2", is then established such that it is located at Z=znear * (1<<n), where n is an integer that effectively determines the Z resolution for the scene by setting the position of the znear2 plane relative to the znear plane. Z-buffering is performed for all pixels that lie within a range between the znear2 plane and the z-far clipping plane. Any pixels that lie within the range between the znear plane and znear2 plane have Z values clamped, for example, to zero or to the Z value of the clamping plane. Hardware geometry clipping is performed for all pixels where z<znear.

In an example implementation, a conventional Z value compression circuit provided in the graphics pipeline is enhanced to perform Z-clamping within the predetermined range of Z values. The enhanced circuitry includes an adder for left-shifting the Z value one or more bits prior to compression and gates for masking out the most significant non-zero shifted bits to zero.

BRIEF DESCRIPTION OF THE DRAWINGS

These and other features and advantages provided by the invention will be better and more completely understood by referring to the following detailed description of presently preferred embodiments in conjunction with the drawings, of which.

DETAILED DESCRIPTION OF EXAMPLE EMBODIMENTS OF THE INVENTION

Figure 1:
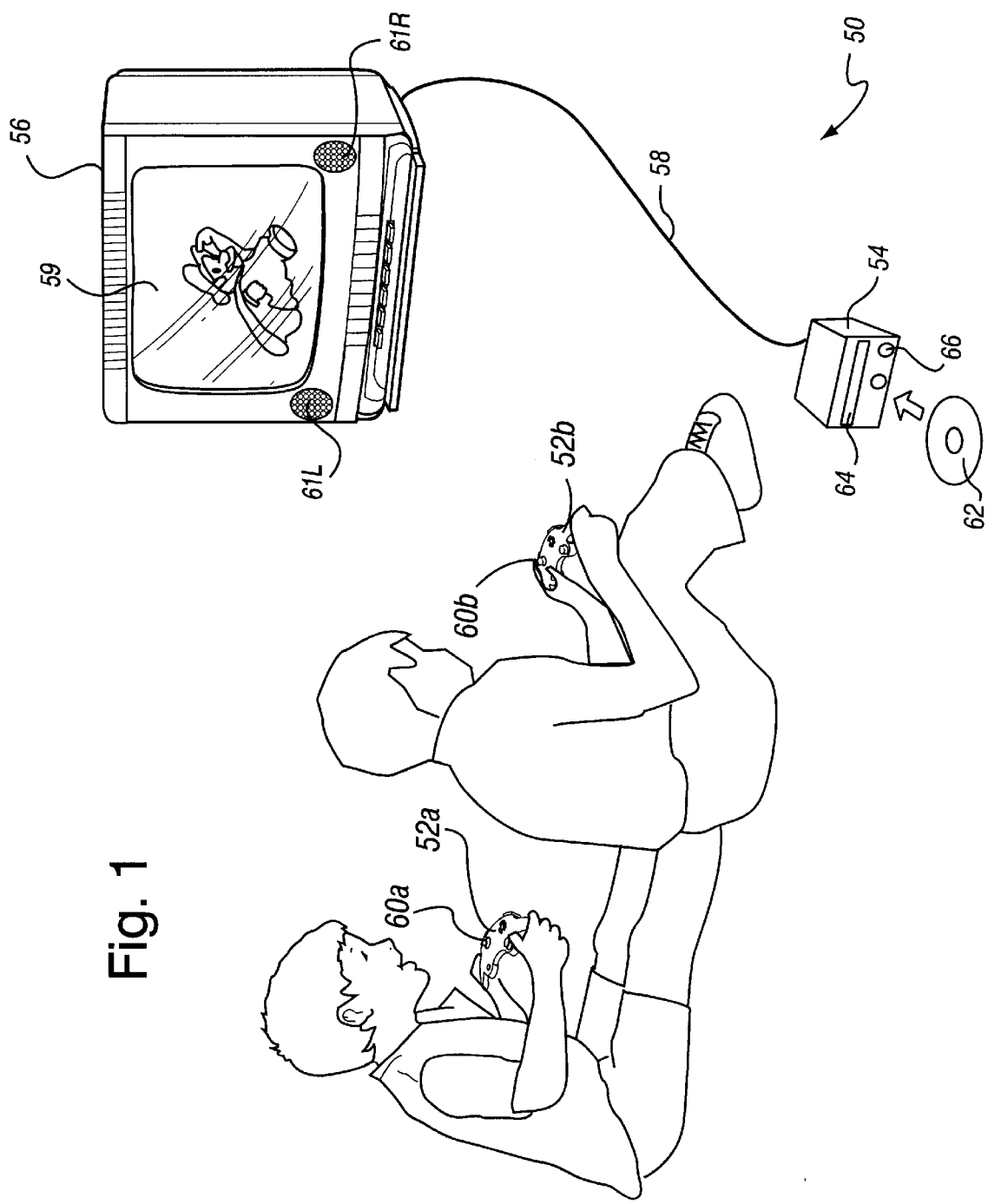
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
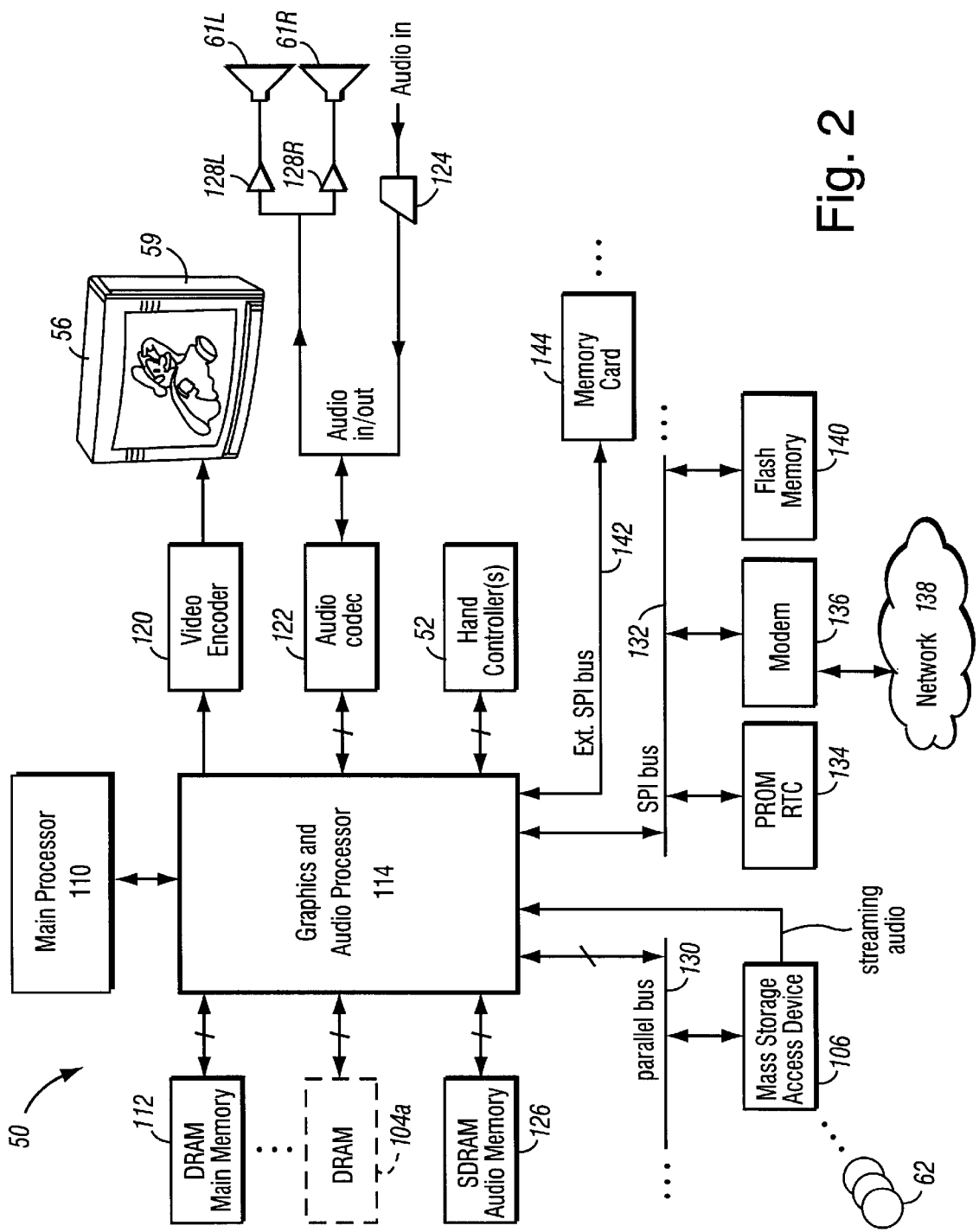
FIG. 2 is a block diagram of the FIG. 1 example computer graphics system.

FIG. 2 shows a block diagram of example components of system.

The Primary Components Include:
- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
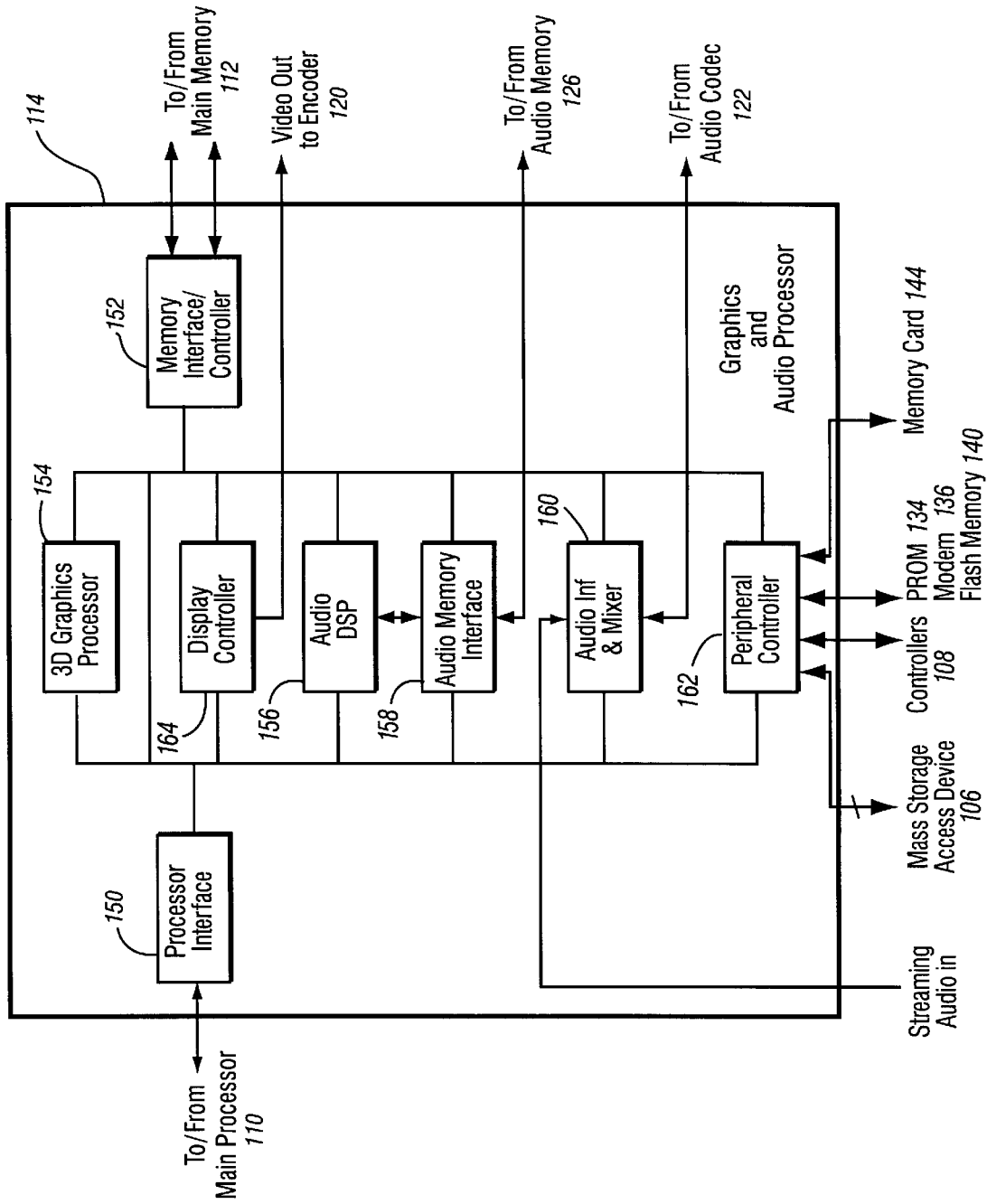
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
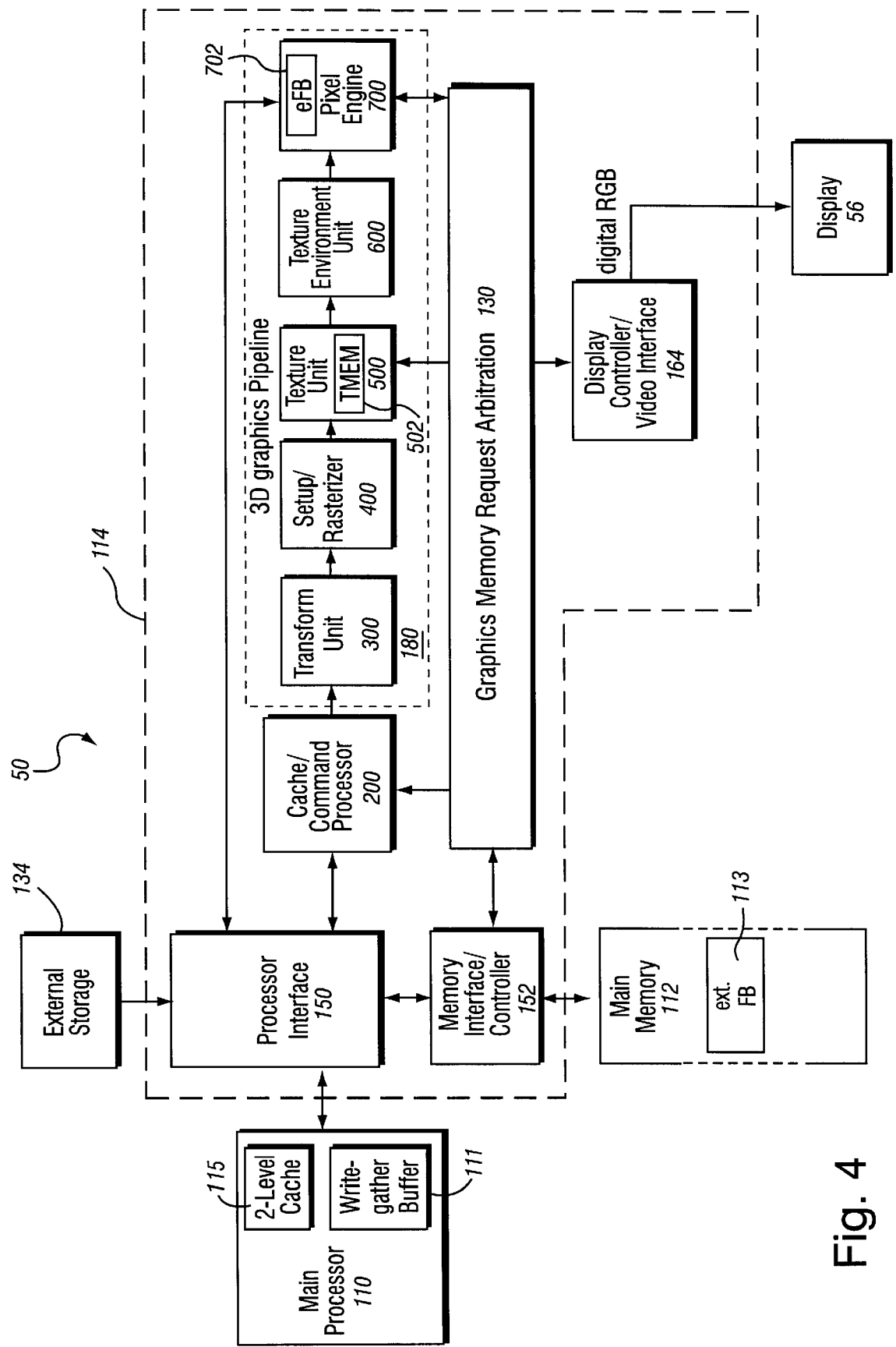
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 10 communicates streams of data (e.g., graphics command streams and display lists) to command processor 200. Main processor 110 has a two-level cache 115 to minimize memory latency, and also has a write-gathering buffer 111 for un-cached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
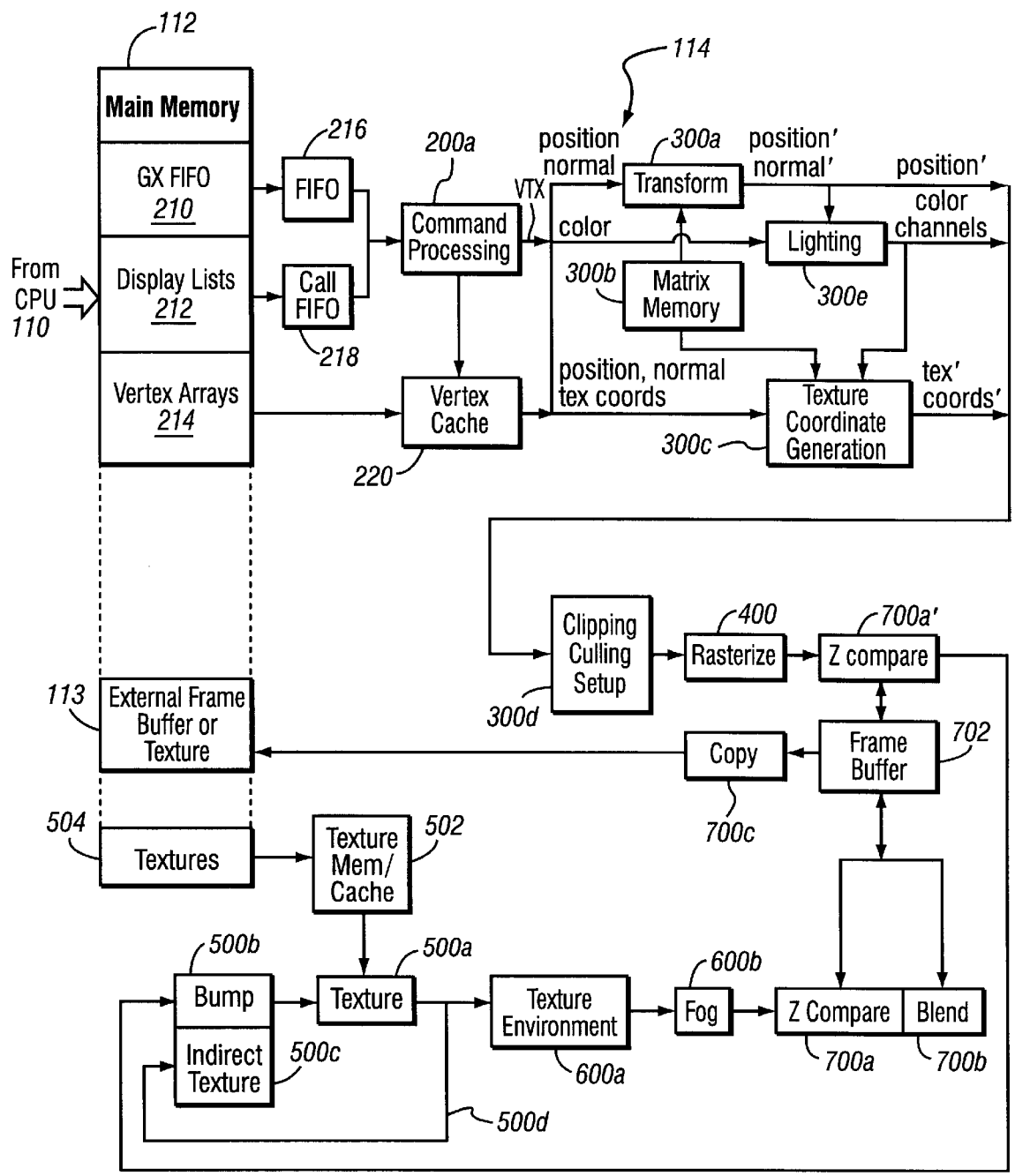
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
- a transform unit 300,
- a setup/rasterizer 400,
- a texture unit 500,
- a texture environment unit 600, and
- a pixel engine 700.

Transform unit 300 performs a variety of 2D and 3D transform and other operations 300*a* (see FIG. 5). Transform unit 300 may include one or more matrix memories 300*b* for storing matrices used in transformation processing 300*a*. Transform unit 300 transforms incoming geometry per vertex from object space to screen space; and transforms incoming texture coordinates and computes projective texture coordinates (300*c*). Transform unit 300 performs polygon clipping/culling (300*d*). Lighting processing 300*e*, also performed by transform unit 300, provides per vertex lighting computations for up to eight independent lights in one example embodiment. Transform unit 300 may also perform texture coordinate generation (300*c*) for emboss-style bump mapping effects. Also, as discussed later herein in greater detail, Transform unit 300 performs depth (Z value) compression and clamping.

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:
- retrieving textures 504 from main memory 112,
- texture processing (500*a*) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500*b*), and
- indirect texture processing (500*c*).

Texture unit 500 performs texture processing using both regular (non-indirect) and indirect texture lookup operations. A more detailed description of the example graphics pipeline circuitry and procedures for performing regular and indirect texture look-up operations is disclosed in commonly assigned co-pending patent application, Ser. No. 09/722,382, entitled "Method And Apparatus For Direct And Indirect Texture Processing In A Graphics System" and its corresponding provisional application, Ser. No. 60/226,891, filed Aug. 23, 2000, both of which are incorporated herein by reference.

Texture unit 500 outputs filtered texture values to the Texture Environment Unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Texture environment unit 600 can also combine (e.g., subtract) textures in hardware in one pass. For more details concerning the texture environment unit 600, see commonly assigned application Ser. No. 09/722,367 entitled "Recirculating Shade Tree Blender for a Graphics System" and its corresponding provisional application, No. 60/226,888, filed Aug. 23, 2000, both of which are incorporated herein by reference.

Pixel engine 700 performs depth (Z value) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z value depth compares 700*a*' can also be performed at an earlier stage in the graphics pipeline 180 depending on the rendering mode currently in effect (e.g., Z value compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects.

In this example graphics system, Anti-aliasing and other filtering can be also performed during the copy-out operation. For more details concerning anti-aliasing see provisional application No. 60/226,900, filed Aug. 23, 2000 and its corresponding utility application Ser. No. 09/726,226, filed Nov. 28, 2000, both entitled "Method And Apparatus For Anti-Aliasing In A Graphics System", both of which are incorporated herein by reference.

The frame buffer output of graphics pipeline 180 (which is ultimately stored in main memory 112) is read each frame by display/video interface unit 164. Display controller/video interface 164 provides digital RGB pixel values for display on display 102.

Example Z-Clamping Arrangement

Figure 6:
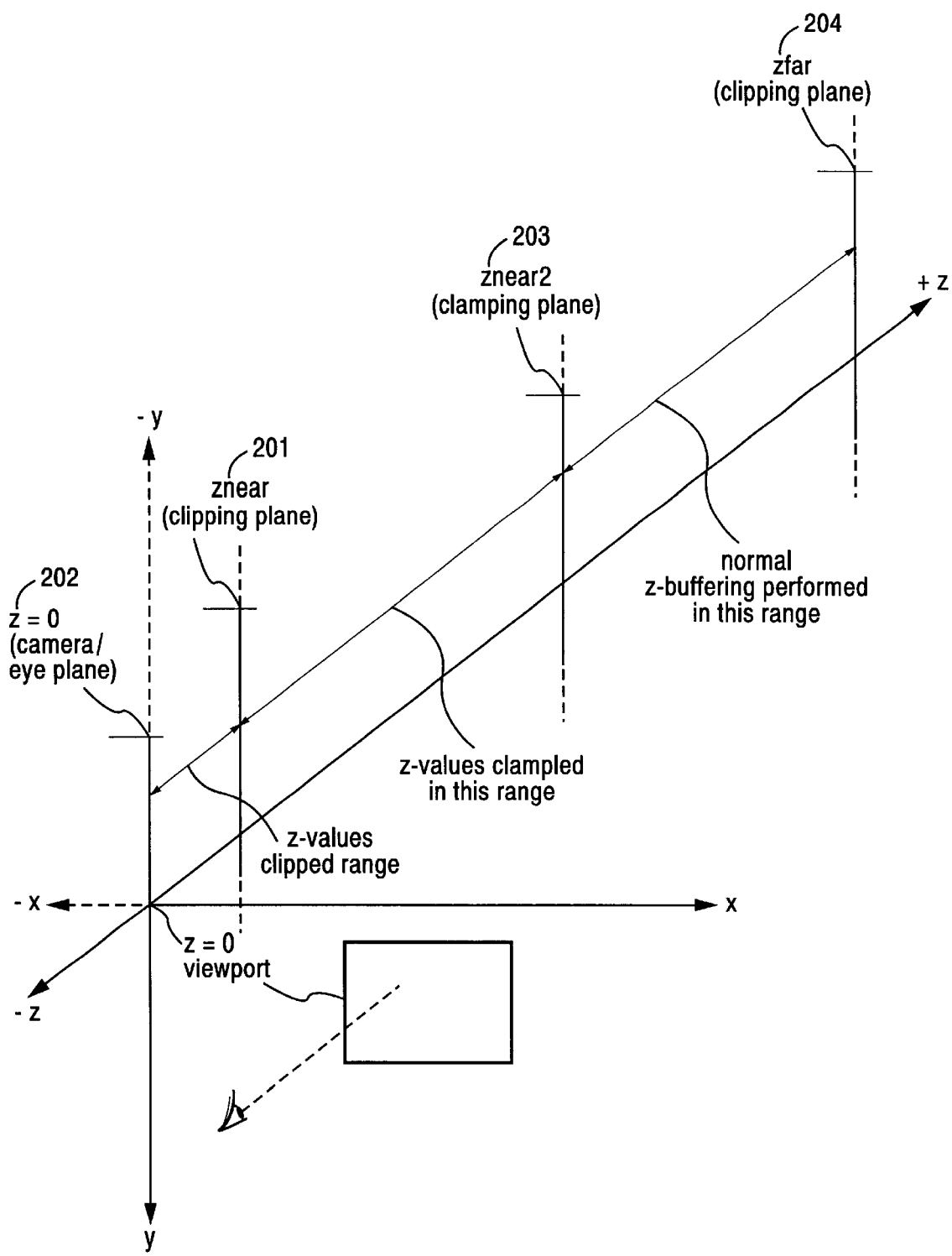
FIG. 6 is a flow chart illustrating example steps for implementing Z-clamping in the near Z range in accordance with the present invention.

A Z-clamping arrangement is used to improve the precision of the visually important Z-axis (depth) attributes of rendered scene components by clamping to zero the Z value of pixels that fall within a predetermined range in front of the eye/camera (viewport) plane at Z=0. FIG. 6 illustrates an example of the Z value clamping arrangement of the present invention as viewed in screen space. A Z-clipping plane 201, "znear", is defined very close to the Z=0 eye/camera plane 202, so as to avoid undesirable visual artifacts produced when objects are rendered too near to the eye/camera plane. A clamping plane 203, "znear2", is established such that znear2 is located at a Z plane equal to znear*(1<<n), where n is an integer that effectively determines the Z resolution for the scene by setting the position of the znear2 plane relative to the znear plane. A far clipping plane 204, "zfar", is also established at a Z plane far from the Z=0 plane. Z-buffering is performed for all pixels that lie within a range between the znear2 plane and the z-far clipping plane. Any pixels that lie within the range between the znear plane and znear2 plane have Z values clamped, for example, to zero (or to some minimum Z value such as the Z value of the znear2 clamping plane) and normal clipping is performed on geometry for all pixels where z<znear.

Figure 7:
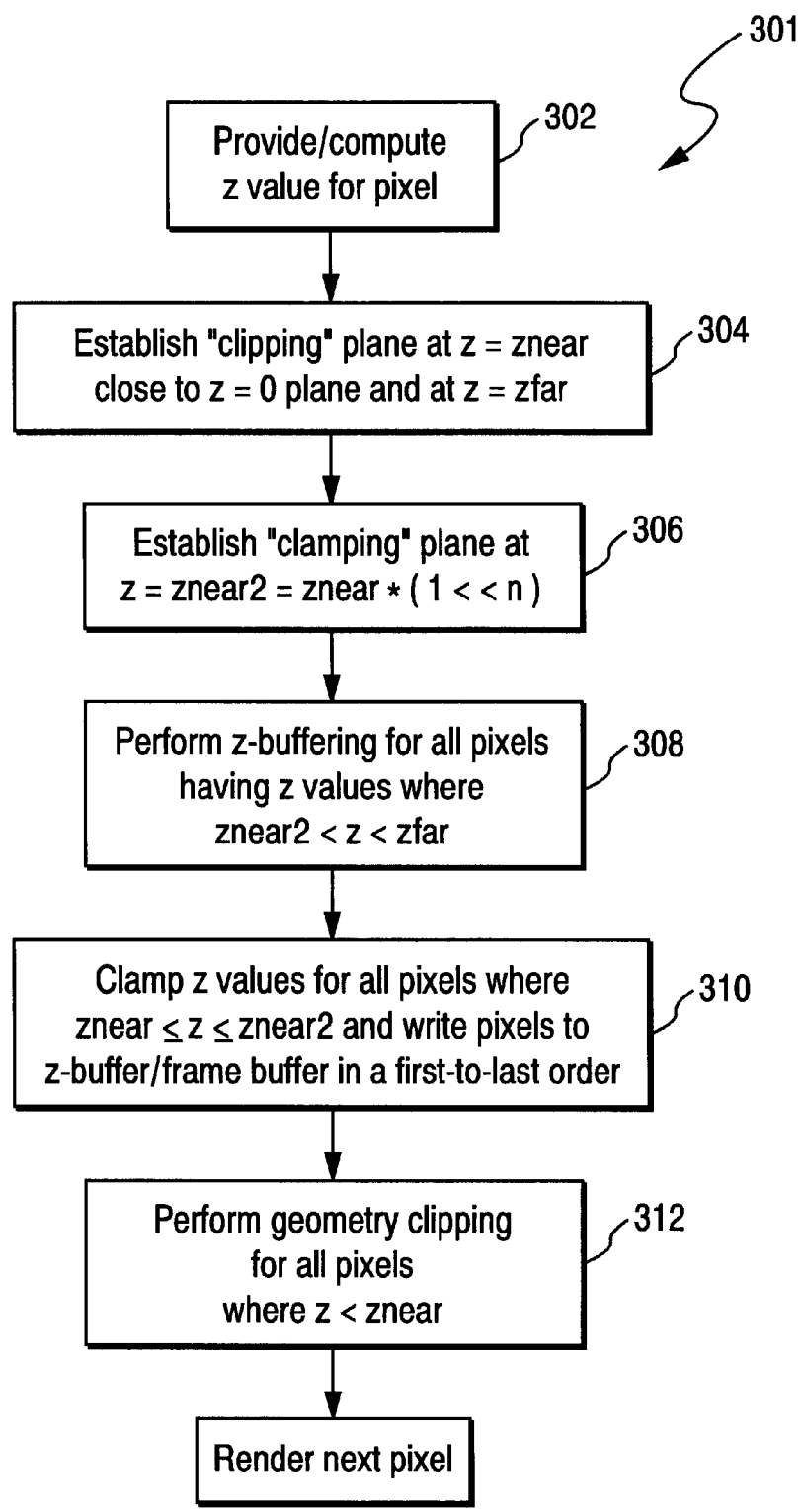
FIG. 7 is a diagram illustrating in screen space the near-Z clamping arrangement of the present invention.

FIG. 7 shows a flowchart of an example set of general processing steps 301 for obtaining improved Z precision when implementing Z-buffering in a graphics processing system. A "Z" depth value is generally computed or provided to the graphics rendering system as an polygon vertex attribute, as indicated at block 302. In the Z-clamping method of the present invention, a clipping plane "znear" is established at a Z axis plane very close to the Z=0 plane and another clipping plane "zfar" is established at Z axis position far from the Z=0 plane, as indicated at block 304. A clamping plane "znear2" is also established, as indicated at block 306, at a Z axis plane where Z=znear2=znear * (1<<n), where n is an integer that effectively determines the Z resolution for the scene by setting the position of the znear2 plane relative to the near znear plane (i.e., the farther the znear2 plane is positioned from the znear plane, the greater the Z-buffering resolution available for that portion of the rendered scene that is farther from the camera/eye plane than the znear2 plane). Normal Z-buffering is performed for all pixels having Z values where znear2<Z<zfar, as indicated at block 308. For pixels having Z values equal to or between the znear and the znear2 clamping planes (i.e., where znear≦Z≦znear2), the Z value is clamped (e.g., clamped to zero or to a minimum value such as the value of the znear2 plane) and the corresponding pixels are written to the frame buffer in a first-to-last order, as indicated in block 310. For pixels where Z<znear, conventional geometry clipping is performed, as indicated at block 312. In the example graphics pipeline embodiment, most of the FIG. 7 steps are performed by clipping logic and an enhanced Z-compression logic in Transform Unit 300, as described in the example hardware implementation below.

Example Hardware Implementation

Figure 8A:
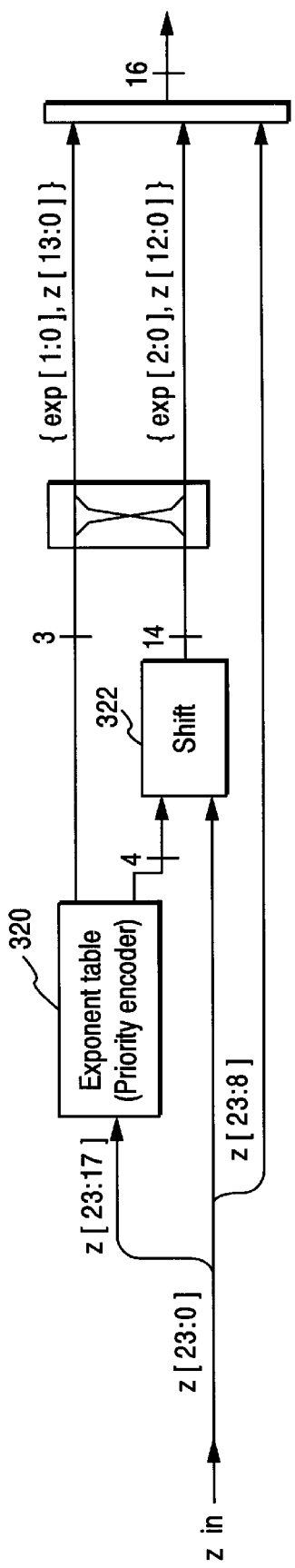
FIG. 8A is an example hardware logic diagram for implementing Z compression in the graphics pipeline embodiment of the present invention.

In example graphics pipeline 180, Transform Unit 300 includes both clipping plane logic circuitry and Z-compression logic circuitry. Because processing anti-aliased pixels requires more data to be stored in a limited size Z-buffer (i.e., embedded Frame Buffer 702), the Z value compression is performed in this example embodiment only when full scene anti-aliasing is enabled. Such Z-compression circuitry normally operates to compress a computed 24 bit Z attribute value to a 16 bit value. FIG. 8A shows example hardware logic circuitry that may be used for providing Z compression without providing any clamping of Z values. This example Z compression circuit essentially comprises a priority encoder 320 and a shifter 322 which performs compression on four 24 bit Z values, converting them to 16 bit values.

In the example implementation of graphics pipeline 180, a compression algorithm performs a type of reverse floating point encoding. Whereas conventional floating point notation clumps most of the resolution towards the lower end of the number scale, the properties of screen-space Z necessitate providing most of the resolution towards the upper end of the number scale. To accomplish such, three compression schemes are used, with a selection between the three schemes being based on the particular near-to-far ratio used in the rendered scene. For example, when using orthographic projection or small far-to-near ratios, a direct linear compression mapping is used wherein the lower eight bits are simply stripped from the input Z value. For medium far-to-near ratios, a floating point conversion to 16 bits using 14e2 notation is used to represent a 24 bit Z value. This form of compression provides an effective 15 bit resolution bits at the near plane and a 17 bit resolution at the far plane. For high far-to-near ratios, a floating point conversion to 16 bits using 13e3 notation is used to represent the 24 bit Z value. This has an effective resolution of 14 bits at the near plane and 20 bits at the far plane.

One straight forward simple implementation of the above floating point conversion approach to compression involves selecting an exponent and a shift value, then shifting the input value down by an amount of the shift value and appending the exponent at the high order bit position. In the example embodiment, an exponent and shift value are chosen by detecting the particular range of values within which the upper bits of an input Z value fall, as indicated by the following tables:

| For 14e2 notation compression: | | |
|---|---|---|
| z [23:21] | exp | shift |
| 000-011 | 0 | 9 |
| 100-101 | 1 | 8 |
| 110-110 | 2 | 7 |
| 111-111 | 3 | 7 |

| For 13e3 notation compression: | | |
|---|---|---|
| z [23:17] | exp | shift |
| 0000000-0111111 | 0 | 10 |
| 1000000-1011111 | 1 | 9 |
| 1100000-1101111 | 2 | 8 |
| 1110000-1110111 | 3 | 7 |
| 1111000-1111011 | 4 | 6 |
| 1111100-1111101 | 5 | 5 |
| 1111110-1111110 | 6 | 4 |
| 1111111-1111111 | 7 | 4 |

Figure 8B:
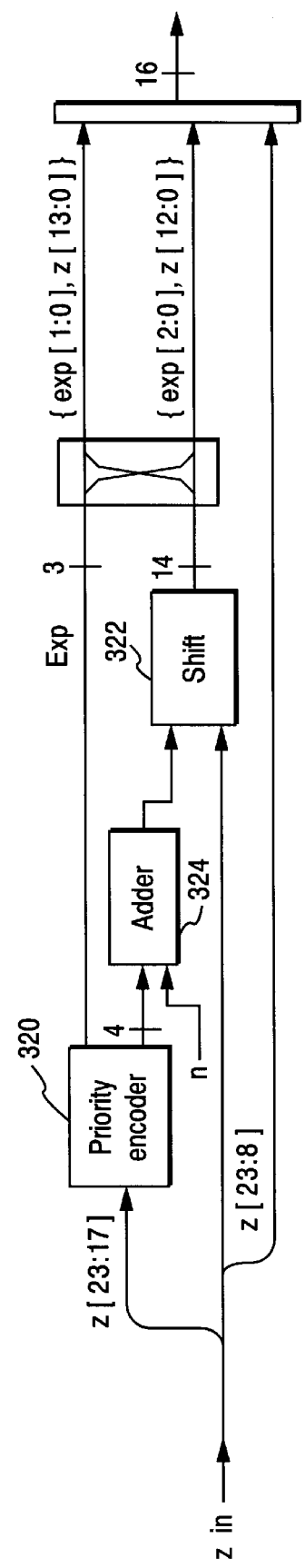
FIG. 8B is a hardware logic diagram for implementing an example near-Z clamping arrangement in the graphics pipeline embodiment of the present invention.

In the present example, Transform Unit 300 may use conventional hardware clipping circuitry for programmably setting and providing Z near and Z far clipping planes (as well as appropriate X and Y axis clipping planes). To implement the Z-clamping arrangement and setting a Z-clamping plane as described above, Transform Unit 300 uses an enhanced Z-compression logic circuitry as shown in FIG. 8B. In addition to the shifting of bits that is associated with Z value compression, this circuit allows additional shifting of one or more of the most significant bits (MSBs) of the input Z value to be performed when implementing one of the above two floating point conversion compression schemes. As shown in FIG. 8B, this enhanced circuit arrangement uses a priority encoder 320, a 4-bit (or smaller) adder 324 and a shifter 322, plus AND gates (not shown) for masking the most significant Z-value bits. The shifting of the pre-compressed input Z value is determined by programmable adder 324, where "n" represents the number of additional bit position shifts to be performed.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 9:
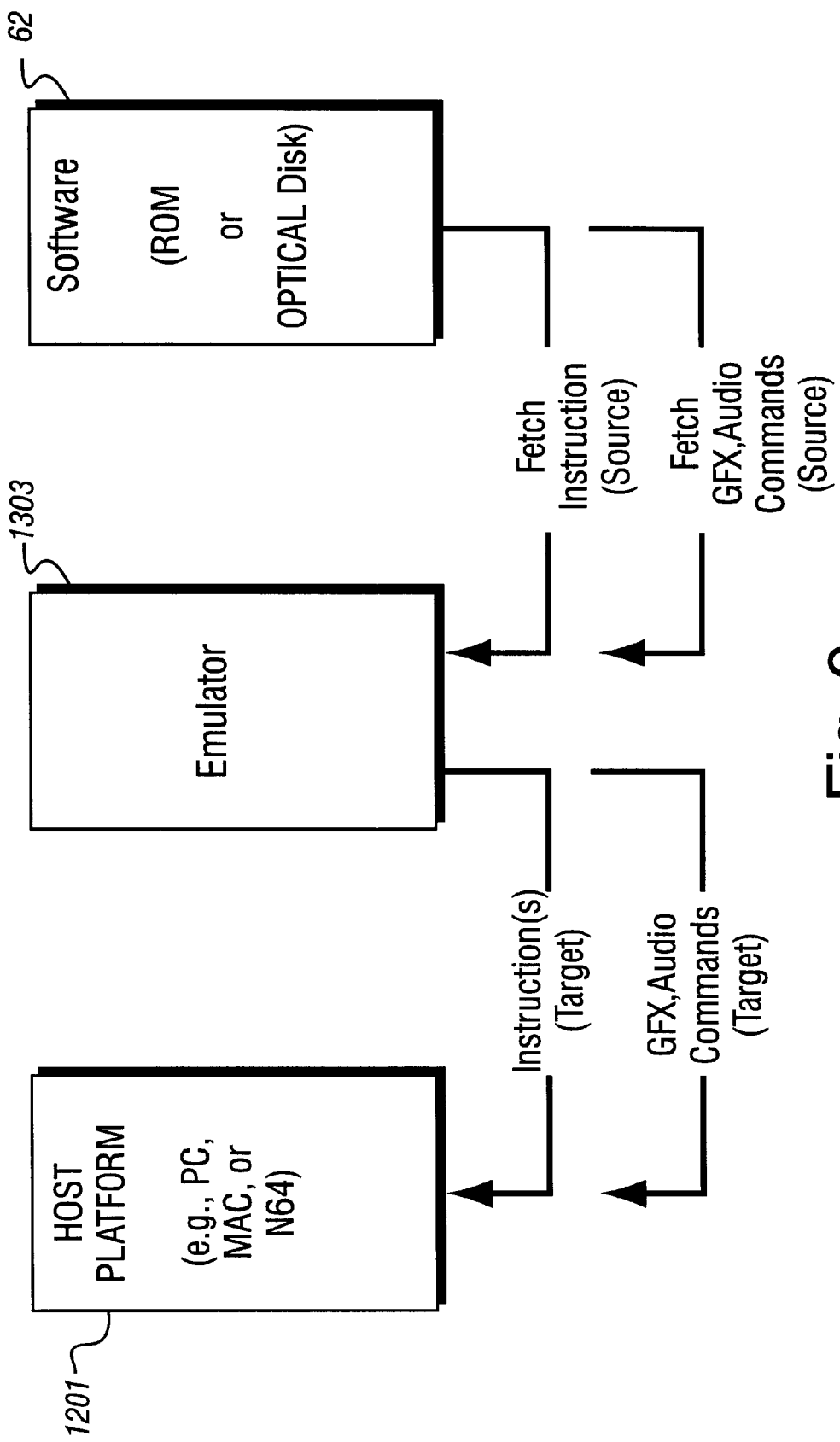
FIGS. 9 and 10 show example alternative compatible implementations.

FIG. 9 illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended. In the case where particular graphics support hardware within an emulator does not include the near-z processing functions shown in FIGS. 7 and 8, the emulator designer has a choice of either:

implementing the near-z processing functions in software with a potential corresponding decrease in performance depending upon the speed of the processor, or "stubbing" (i.e., ignoring) the near-z processing to provide a rendered image that may have near image artifacts.

While the FIG. 6 flowchart may be implemented entirely in software, entirely in hardware or by a combination of hardware and software, the preferred embodiment performs most of these calculations in hardware to obtain increased speed performance and other advantages. Nevertheless, in other implementations (e.g., where a very fast processor is available), the computations and steps of FIG. 6 may be implemented in software to provide similar or identical imaging results.

Figure 10:
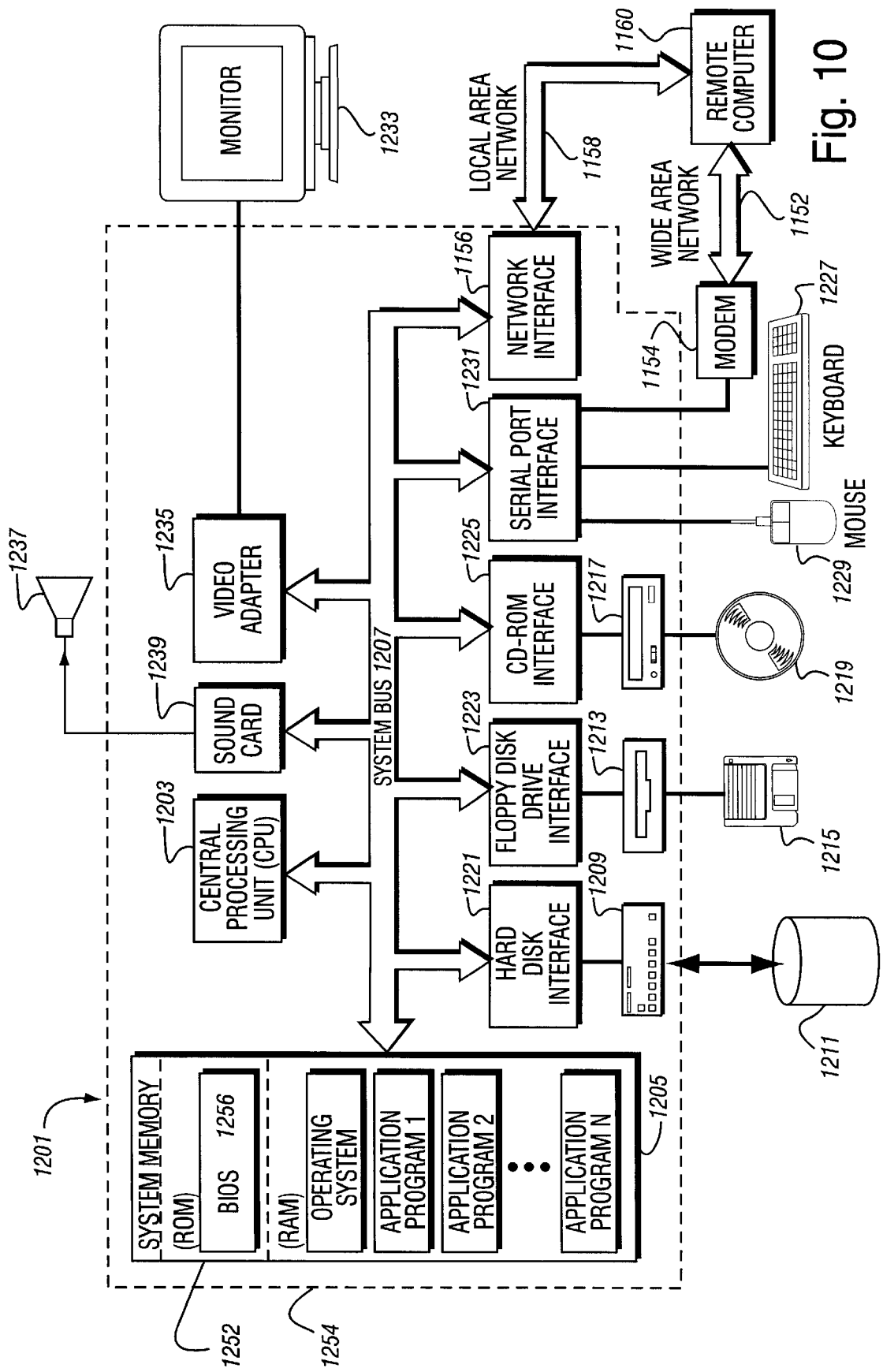

FIG. 10 illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. In a 3D graphics rendering system, a method of performing Z buffering, comprising:

establishing a first clipping plane, znear, at a Z-axis position very near to the Z=0 plane and a second clipping plane, zfar, at a Z-axis position very far from the z=0 plane;

establishing a Z-axis value clamping plane, znear2, at z=znear2=znear*(1<<n), wherein "n" is a predetermined integer value that sets a position of the znear2 clamping plane relative to the znear plane and effectively provides a predetermined z value resolution for a portion of a rendered scene that lies between the znear2 plane and the zfar plane;

performing conventional Z-buffering for pixels having z values where znear2<z<zfar; and clamping z values to a predetermined value for pixels where znear≦z≦znear2, wherein pixel data corresponding to clamped z values is written to a display frame buffer in a first to last rendered order.

2. The graphics system of claim 1 wherein the predetermined value for clamped Z values is zero.

3. In a 3D graphics rendering system including a processor and a separate graphics processing pipeline having transformation and lighting circuitry, the pipeline performing Z buffering, an arrangement included within the graphics pipeline for providing Z value compression and selectable Z value clamping, comprising:

a priority encoder and a shifter, wherein said priority encoder provides a shift value to said shifter for performing a binary value compression operation; and an adder including bit masking circuitry, said adder connected between the priority encoder and the shifter, wherein said adder is used to selectably increase a shift value provided by the priority encoder to said shifter during a Z value compression operation to effectively clamp Z values within a selectable predetermined range.

4. The graphics system of claim 3 wherein said predetermined Z value is zero.

5. The graphics system of claim 3 wherein said predetermined range of Z values is determined by a Z clipping plane, znear, defined at a predetermined Z-axis position very near to the z=0 plane and a Z clamping plane, znear2, defined at z=znear2=znear*(1<<n), where "n" is equal to an integer value indicative of a selected increase in shift value provided to said priority encoder.

6. In a 3D graphics rendering system including a processor and a separate graphics processing pipeline, the pipeline performing full scene anti-aliasing with Z-value compression, a method for selectably setting a predetermined Z value resolution for a portion of a rendered scene, comprising:

shifting a binary Z-value one or more bit positions prior to performing Z value compression, wherein the amount of shifting determines a range of Z values near a Z=0 plane for which Z values are clamped to a predetermined value.

7. In a graphics processing system that renders and displays images at least in part in response to polygon vertex attribute data including Z-value binary data stored in an associated memory, a Z value compression processing circuit portion embodied in hardware, comprising:

a priority encoder, a shifter, and an adder connected between the priority encoder and the shifter, wherein the adder may be used to selectably increase a value provided by said priority encoder to said shifter for shifting the Z-value binary data an additional predetermined number of bit positions during a compression operation to effectuate a clamping of Z values that are within a predetermined range of Z values to a predetermined value.

* * * * *